US006854496B2

(12) United States Patent
Ishibuchi et al.

(10) Patent No.: US 6,854,496 B2
(45) Date of Patent: Feb. 15, 2005

(54) DOUBLE FACER FOR USE IN CORRUGATED FIBERBOARD SHEET MANUFACTURING SYSTEM

(75) Inventors: Hiroshi Ishibuchi, Hiroshima-ken (JP); Hideo Okuhara, Hiroshima-ken (JP); Akihisa Fujita, Hiroshima-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/951,521

(22) Filed: Sep. 14, 2001

(65) Prior Publication Data

US 2002/0036067 A1 Mar. 28, 2002

(30) Foreign Application Priority Data

Sep. 22, 2000 (JP) ....................................... 2000-288696

(51) Int. Cl.[7] ................................................ B32B 31/00

(52) U.S. Cl. ....................... 156/351; 156/359; 156/361; 156/470

(58) Field of Search .......................... 156/64, 210, 350, 156/358, 359, 360, 367, 378, 379, 470, 351, 361

(56) References Cited

U.S. PATENT DOCUMENTS 3,829,338 A * 8/1974 Hayasi et al. ................. 156/64
3,981,758 A * 9/1976 Thayer et al. ................ 156/64
4,556,444 A * 12/1985 Schommler ................. 156/359
5,244,518 A * 9/1993 Krayenhagen et al. ......... 156/64
5,527,408 A 6/1996 Allen
5,632,830 A * 5/1997 Marschke .................... 156/64
5,802,736 A 9/1998 Klockenkemper et al.

FOREIGN PATENT DOCUMENTS

| | | |
|---|---|---|
| EP | 0 936 059 A2 | 8/1999 |
| EP | 0 940 247 | 9/1999 |
| GB | 2 289 901 | 12/1995 |
| JP | 1-270963 | 10/1989 |
| JP | HEI 2-115766 | 4/1990 |
| JP | HEI 10-244607 | 9/1998 |
| JP | 11-221870 | 8/1999 |
| JP | 2000-15723 | 1/2000 |

OTHER PUBLICATIONS

Copy of Australia Patent Office Communication for corresponding Australian Patent Application 75576/01 dated Jun. 14, 2002.

Notice for Reasons of Rejection, Jun. 27, 2003, Japan, (translation attached).

* cited by examiner

*Primary Examiner*—Gladys JP Corcoran

(74) *Attorney, Agent, or Firm*—Armstrong, Kratz, Quintos, Hanson & Brooks, LLP

(57) ABSTRACT

A double facer for use in a corrugated fiberboard sheet manufacturing system wherein a moisture content of a double faced corrugated fiberboard sheet is set at an optimum value at all times for stably producing the double faced corrugated fiberboard sheet with less bonding failure and less warp. The double facer comprises moisture content detecting means for detecting a moisture content of the double faced corrugated fiberboard sheet after passed through the heating means or for detecting a parameter correlating with the moisture content, and a control means for controlling a heat reception quantity of the double faced corrugated fiberboard sheet on the basis of a detection result from the moisture content detecting means so that the moisture content of the double faced corrugated fiberboard sheet approaches a predetermined optimum moisture content.

26 Claims, 4 Drawing Sheets

DOUBLE FACER FOR USE IN CORRUGATED FIBERBOARD SHEET MANUFACTURING SYSTEM

BACKGROUND OF THE INVENTION

1. Field of the Invention

The present invention relates to a double facer for use in a corrugated fiberboard sheet manufacturing system.

2. Description of the Related Art

A corrugated fiberboard sheet manufacturing system is made up of a single facer for forming a single faced corrugated fiberboard sheet by sticking a back linerboard and a wave-shaped corrugated medium together, and a double facer for forming a double faced corrugated fiberboard sheet by sticking the single faced corrugated fiberboard sheet and a front linerboard.

In the double facer, a single faced corrugated fiberboard sheet and an front linerboard, put in a superposed condition, are conveyed in a state placed between a heating means (for example, heating box) and a pressing means (for example, cylinder), thereby forming the aforesaid double faced corrugated fiberboard sheet.

A glue is applied previously onto flute tips of the single faced corrugated fiberboard sheet, and the single faced corrugated fiberboard sheet and the front linerboard are stuck to each other by the heating and pressing of the heating means and pressing means, thereby forming the double faced corrugated fiberboard sheet.

For reducing wrap or bonding failure of the double faced corrugated fiberboard sheet, there is a need to set the moisture content of the double faced corrugated fiberboard sheet at an appropriate value.

This moisture content varies with a pressing force of the aforesaid pressing means. This is because, as the pressing force of the pressing means increases, the double faced corrugated fiberboard sheet is more strongly pressed against the heating means to enhance the heating action to the double faced corrugated fiberboard sheet.

For this reason, in the conventional art, for optimizing the moisture content, an operator adjusts the pressing force of the pressing means manually in dependence upon his/her perception and experience. However, in fact, such a manual way encounters difficulty in promptly and appropriately setting a moisture content agreeing with fiberboard type, feed speed or the like, which can cause bonding failure or warp of a double faced corrugated fiberboard sheet which cannot be disregarded.

SUMMARY OF THE INVENTION

The present invention has been developed with a view to eliminating such a problem, and it is therefore an object of the present invention to provide a double facer for use in a corrugated fiberboard sheet manufacturing system, capable of always optimizing the moisture content of a double faced corrugated fiberboard sheet to stably manufacture the double faced corrugated fiberboard sheet with less bonding failure and less wrap.

For this purpose, in accordance with the present invention, there is provided a double facer for use in a corrugated fiberboard sheet manufacturing system which conveys a single faced corrugated fiberboard sheet and a linerboard in a state where they are placed in a superposed condition and put between heating means and pressing means for forming a double faced corrugated fiberboard sheet, the double facer comprising moisture content detecting means for detecting moisture content of the double faced corrugated fiberboard sheet after passed through the heating means or a parameter correlating with the moisture content, and control means for controlling a heat reception quantity of the double faced corrugated fiberboard sheet on the basis of a detection result from the moisture content detecting means so that the moisture content of the double faced corrugated fiberboard sheet approaches a predetermined optimum moisture content.

In this case, it is also appropriate that the control means controls a pressing force of the pressing means to control the heat reception quantity.

Alternatively, it is also appropriate that the control means controls a heating quantity of the heating means to control the heat reception quantity.

In addition, it is also appropriate that the control means includes a first control element for implementing the heat reception quantity control through the use of feedback control when a deviation between desired moisture content and moisture content detected on the basis of detection information from the moisture content detecting means is below a predetermined value, and a second control element for implementing the heat reception quantity control through the use of feedforward control when the deviation therebetween is equal to or more than the predetermined value.

Still additionally, it is also appropriate that the control means further includes a third control element for implementing preset control during an order change to realize the heat reception control agreeing with the order change.

Moreover, it is also appropriate that the control means further includes a fourth control element for, when feed speeds of the single faced corrugated fiberboard sheet and the linerboard are lower than a predetermined speed, implementing preset control to realize the heat reception control agreeing with the feed speed lower than the predetermined speed.

Still moreover, it is also possible that a temperature sensor is used as the moisture content detecting means, or that a moisture sensor is used as the moisture content detecting means.

In the above-described configuration, it is also appropriate that the double facer further comprises scanning means for shifting the moisture content detecting means to scan the double faced corrugated fiberboard sheet in its width direction and time-averaging means for time-averaging outputs of the moisture content detecting means scanning-shifted by the scanning means.

Alternatively, it is also appropriate that a plurality of the moisture content detecting means are located at a predetermined interval in a width direction of the double faced corrugated fiberboard sheet, and width direction-averaging means is additionally provided to average outputs of the plurality of moisture content detecting means.

The double facer thus constructed for a corrugated fiberboard sheet manufacturing system can offer an advantage of optimizing the moisture content of the double faced corrugated sheet through the heat reception control to stably manufacture a high-quality corrugated fiberboard sheet with less bonding failure and less wrap at all times.

In addition, since an optimum moisture content agreeing with a feed speed, a fiberboard type, a basic weight and others can be set through the heat reception control, thus improving operability and manpower-saving.

DESCRIPTION OF THE PREFERRED EMBODIMENTS

Embodiments of the present invention will be described herein below with reference to the drawings. The description will start at a double facer for use in a corrugated fiberboard sheet manufacturing system according to a first embodiment of the invention.

Figure 1:
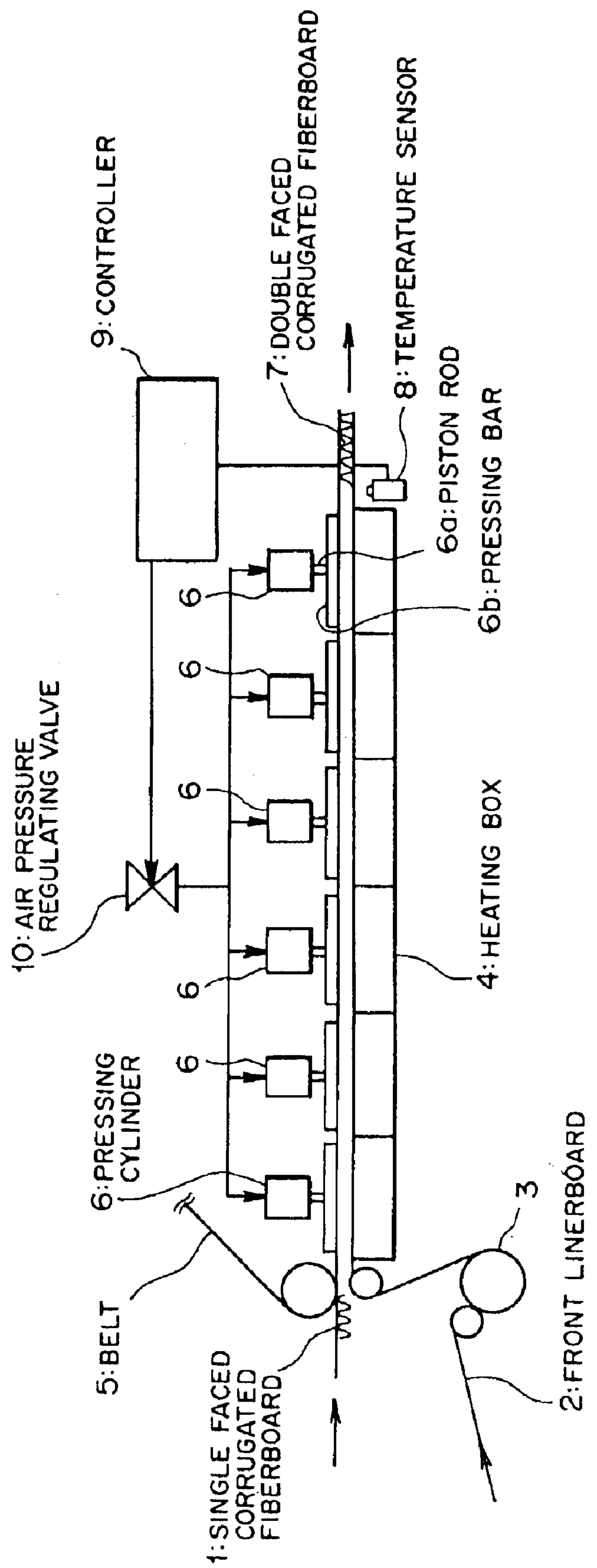
FIG. 1 illustratively shows a construction of a double facer according to a first embodiment of the present invention.

FIG. 1 illustratively shows a construction of a double facer for a corrugated fiberboard sheet manufacturing system according to this embodiment.

This double facer is for sticking a single faced corrugated fiberboard sheet 1 formed by a single facer (not shown) and an front linerboard 2 together, and is made up of a heating roller 3 for preheating the front linerboard 2, a heating box (heating means) 4, a pressing belt (canvas belt) 5 which circulates above the heating box 4, plurality of pressing cylinders (pressing means) 6 placed in opposed relation to an upper surface of the heating box 4 in a state where the pressing belt 5 is interposed therebetween.

The heating box 4 is heated by steam, and the pressing cylinder 6 is operated by air pressure, with a pressing bar 6*b* being fitted to the tip portion of a piston rod 6*a* of each of the pressing cylinder 6 for pressing the back of the pressing belt 5.

Immediately before the single faced corrugated fiberboard sheet 1 is fed into the double facer, a glue is applied to the flute tops thereof by a gluing device (not shown). This glue-applied single faced corrugated fiberboard sheet 1 and the front linerboard 2 preheated by the heating roller 3 are put between the heating box 4, placed into a heated condition, and the pressing belt 5, and then conveyed while pressed in a superposed condition.

That is, the pressing belt 5 is moved in a state where its back surface is pressed by the pressing bars 6*b* of the pressing cylinders 6 and, therefore, the single faced corrugated fiberboard sheet 1 and the front linerboard 2 are conveyed in the rightward direction in FIG. 1 while being pressed against the upper surface side of the heating box 4. The single faced corrugated fiberboard sheet 1 and the front linerboard 2 are heated by the heating box 4 during the pressing and conveyance, that is, they are stuck to each other during the conveyance. As a result, they are outputted as a double faced corrugated fiberboard sheet 7 from a rear end portion of a sheet path defined by the pressing belt 5 and the heating box 4.

Meanwhile, for reducing wrap or bonding failure of the double faced corrugated fiberboard sheet 7, there is a need to properly set the moisture content of the double faced corrugated fiberboard sheet 7 passing through the sheet path.

The moisture content of the double faced corrugated fiberboard sheet 7 shows a correspondence with respect to the temperature of the sheet 7, and decreases as that temperature becomes higher. In addition, the temperature of the double faced corrugated fiberboard sheet 7 varies in accordance with the pressing force of the aforesaid pressing cylinders 6. This is because, as the pressing force of the pressing cylinders 6 increases, the double faced corrugated fiberboard sheet 7 is more strongly pressed against the upper surface of the heating box 4, thereby enhancing the heating action to the double faced corrugated fiberboard sheet 7.

Therefore, in the embodiment shown in FIG. 1, the temperature of the double faced corrugated fiberboard sheet 7 outputted from the rear end portion of the sheet path is detected as a parameter, correlating with a moisture content of the double faced corrugated fiberboard sheet 7, by a temperature sensor (moisture content detecting means) 8, and the detection result is given to a controller (control means) 9. This controller 9 implements a procedure, which will be described hereinbelow, to control a quantity of heat (heat reception quantity) the double faced corrugated fiberboard sheet 7 receives. This control will be referred to as heat reception control. This heat reception control enables controlling the temperature of the double faced corrugated fiberboard sheet 7 passing through the aforesaid sheet path, more concretely, the linerboard 2 side temperature, to an optimum temperature corresponding to an optimum moisture content of the double faced corrugated fiberboard sheet 7. In this embodiment, the heat reception control is executed by controlling the pressing cylinders 6.

Figure 2:
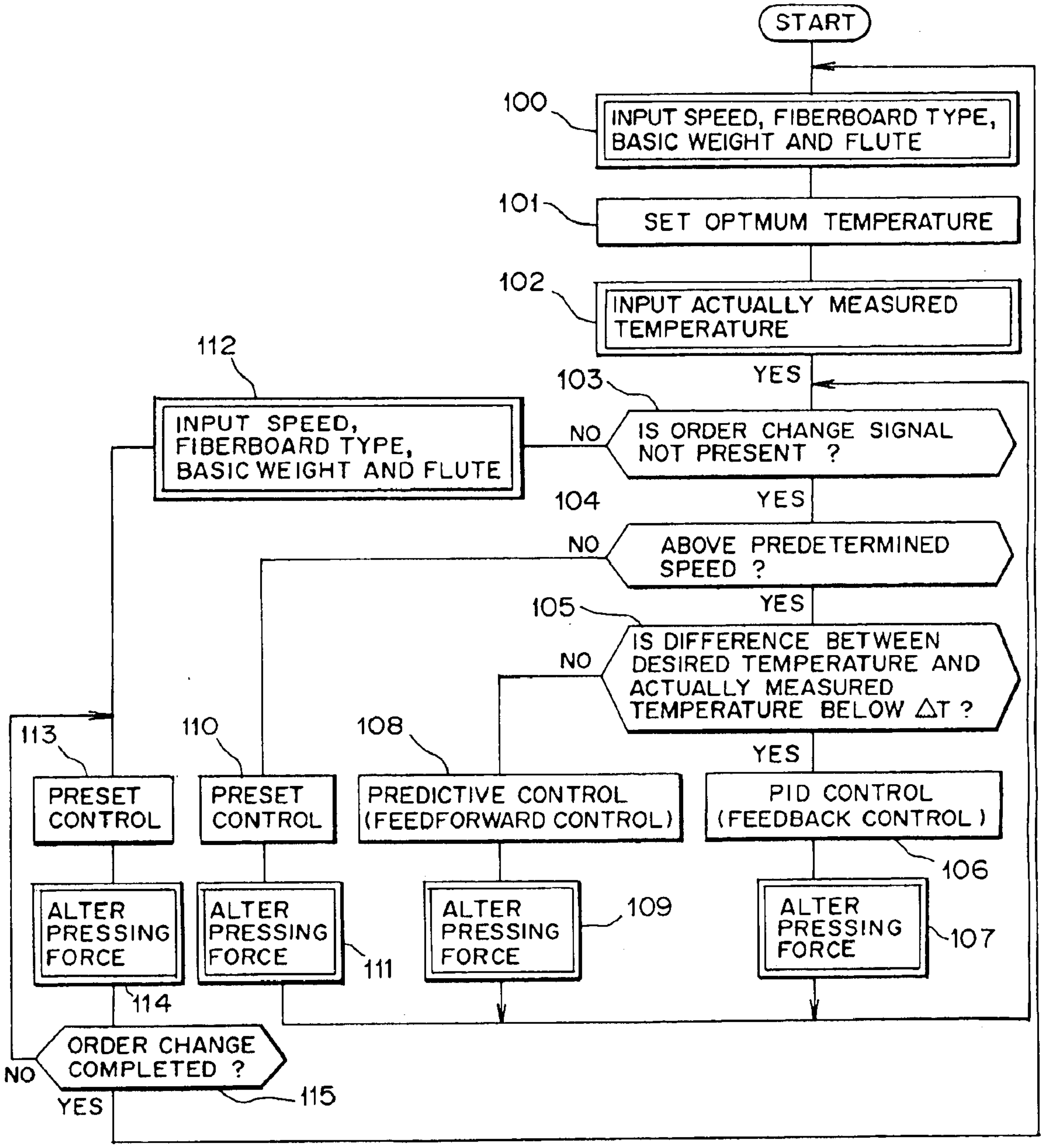
FIG. 2 is a flow chart showing one example of control (procedure to be executed in a controller) for the double face according to the first embodiment of the invention.

FIG. 2 shows an example of a control procedure to be implemented by the controller 9. A description will be given hereinbelow of this procedure with reference to FIG. 2.

[Step 100]

At a step 100, the respective information indicative of a feed speed, fiberboard type, basic weight (weight of fiberboard per square meter) and flute of the aforesaid double faced corrugated fiberboard sheet 7 are inputted from a host managing unit (not shown).

[Step 101]

At a step 101, an optimum temperature of the double faced corrugated fiberboard sheet 7 is set on the basis of the information inputted in the step 100. This optimum temperature is a temperature which does not cause bonding failure and wrap of the double faced corrugated fiberboard sheet 7, and is obtainable in advance through experiments, simulations or the like.

The controller 9 previously stores, in a memory (not shown), an optimum temperature agreeing with the contents of the aforesaid information as a desired temperature, and on the basis of the inputted information and the stored contents in the memory, has a decision means which sets the desired temperature (set temperature) corresponding to the information.

[Step 102]

At a step 102, a temperature detected by the temperature sensor 8 is inputted as the actually measured temperature of the double faced corrugated fiberboard sheet 7.

[Step 103]

At a step 103, a decision is made as to whether or not an order change signal is outputted from the aforesaid host managing unit. This order change signal is issued in the case of formation of a double faced corrugated fiberboard sheet according to a different specification, and at this time the alteration of the feed speed, fiberboard type and others takes place.

[Step 104]

In the case of no issue of the order change signal, at a step 104, a decision is made as to whether or not the feed speed of the doubled faced corrugated linerboard sheet 7 (feed speed of single faced corrugated fiberboard sheet 1 and linerboard 2) exceeds a predetermined speed.

[Step 105]

When the double faced corrugated linerboard sheet 7 runs at a feed speed higher than the predetermined speed, at a step 105, a decision is made as to whether or not the deviation between the aforesaid desired temperature and the actually measured temperature is below ΔT.

[Steps 106 and 107]

When the deviation therebetween is below ΔT, at steps 106 and 107, the pressing force of the aforesaid pressing cylinder 6 is feedback-controlled so that the actually measured temperature equals the desired temperature. That is, an air pressure regulating valve 10 for supplying pressurized air to each of the pressing cylinders 6 is feedback-controlled on the basis of the aforesaid temperature deviation. Thereafter, the operational flow returns to the step 103.

[Steps 108 and 109]

When the aforesaid temperature deviation therebetween exceeds ΔT, at steps 108 and 109, the feedforward control is implemented in order to eliminate this temperature deviation.

Figure 3:
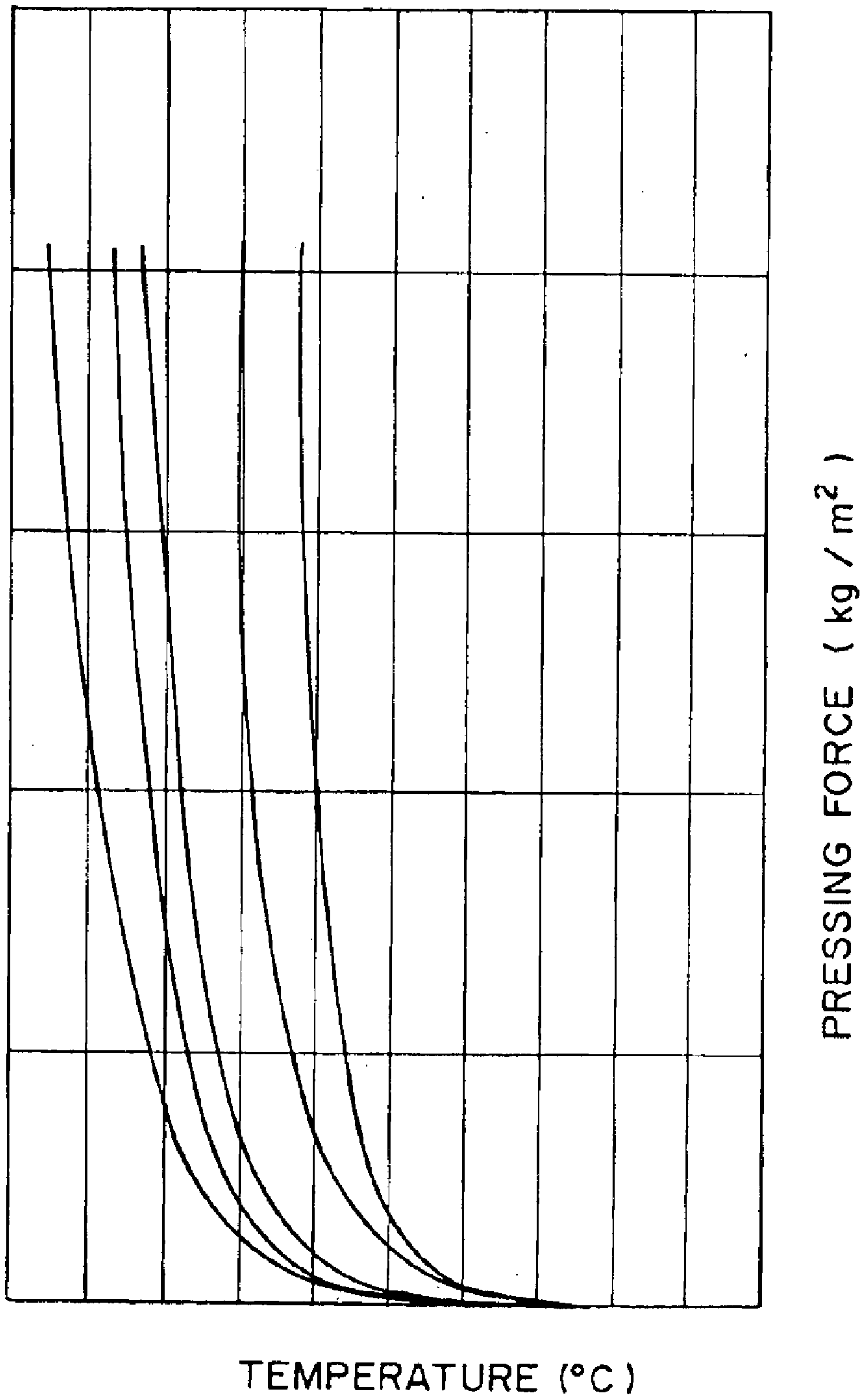
FIG. 3 is a graphic of the relationship between a pressing force and a temperature of a double faced corrugated fiberboard sheet in the double facer according to the first embodiment of the invention.

The relationship between the pressing force of the pressing cylinder 6 and the temperature of the corrugated fiberboard 7 (more concretely, the temperature of the front linerboard of the sheet 7) is previously obtainable through simulations or actual measurements. FIG. 3 is an illustration of an example of this relationship where a feed speed of the corrugated fiberboard sheet 7 is used as a parameter.

A required alteration quantity of the pressing force for varying the temperature of the double faced corrugated fiberboard sheet 7 by 1° C. is found from the afore said relationship. Therefore, the alteration quantity of the pressing force for reducing the temperature deviation promptly is calculated so that the air pressure regulating valve 10 is controlled to vary the pressing force of the pressing cylinder 6 according to that alteration quantity. The aforesaid feedforward control signifies such control.

The aforesaid relationship shown in FIG. 3 is valid for one fiberboard type and one flute. Accordingly, in the case of employment of a different fiberboard type and a different flute, the relationship between the pressing force and the temperature in this case is also set previously through actual measurements or the like, and is also stored previously in the memory (not shown).

After the implementation of this feedforward control, the operational flow returns to the step 103.

[Steps 110 and 111]

When the feed speed of the double faced corrugated fiberboard sheet 7 is lower than a predetermined speed (for example, 200 feet/min), the time of heating to the double faced corrugated fiberboard sheet 7 by the heating box 4 becomes longer. In this case, in the aforesaid feedback control or feedforward control, there is a possibility that the temperature control accuracy of the double faced corrugated fiberboard sheet 7 lowers because of excessive control or the like.

For this reason, at steps 110 and 111, preset control is implemented on the pressing cylinder 6 when the feed speed of the double faced corrugated fiberboard sheet 7 is lower than a predetermined speed. That is, a desired pressing force is preset on the basis of simulations or experiments, and the air pressure regulating valve 10 is controlled to realize this preset desired pressing force. To increase the control speed, this desired pressing force is set so that a controlled variable becomes greater than that in the feedforward control.

Incidentally, the desired pressing force to be preset is naturally preset in consideration of fiberboard type, basic weight and flute.

After the implementation of the aforesaid preset control, the operational flow returns to the step 103.

[Step 112]

The order change requires alteration of some or all of the feed speed, fiberboard type, basic weight and flute of the double faced corrugated fiberboard sheet 7. Accordingly, at a step 112, the aforesaid information are again inputted at an input of an order change signal.

[Steps 113 and 114]

At steps 113 and 114, the temperature of the double faced corrugated fiberboard sheet 7 is preset-controlled. In this case, a plurality of desired pressing forces corresponding to feed speeds, fiberboard types, basic weights and flutes are preset on the basis of simulations, experiments or the like. In addition, a desired pressing force agreeing with the speed, fiberboard type, basic weight and flute inputted in the step 112 is selected from these desired pressing forces, and the aforesaid air pressure regulating valve 10 is controlled to realize this desired pressing force.

Incidentally, the temperature of the double faced corrugated fiberboard sheet 7 is largely varied at an order change. Accordingly, the aforesaid desired pressing force is properly preset to a value whereby the temperature of the double faced corrugated fiberboard sheet 7 varies (rises or drops) promptly up to an appropriate (optimum) temperature.

[Step 115]

At a step 115, on the basis of an order change signal, a decision is made as to whether or not the order change comes to an end. If the operation is in the middle of the order change, the aforesaid preset control continues, and if the order change comes to an end, the operational flow returns to the step 100.

With the above-described procedure, when the aforesaid temperature deviation is equal to or greater than ΔT, the feedforward control is implemented so that the temperature of the double faced corrugated fiberboard sheet 7 approaches a desired temperature, and when the aforesaid temperature deviation is below ΔT, the feedback control is executed so that the temperature of the double faced corrugated fiberboard sheet 7 develops to the desired temperature with high accuracy.

In addition, when the feed speed of the double faced corrugated fiberboard sheet 7 is lower than a predetermined speed, the preset control is implemented to provide a stable temperature control result, for example, with no hunting, and at an order change, the preset control is executed to vary (increase or decrease) the temperature of the double faced corrugated fiberboard sheet 7 up to an appropriate temperature promptly; therefore, after the order change, the temperature of the double faced corrugated fiberboard sheet 7 can be feedback-controlled or feedforward-controlled smoothly.

With the above-described control, the temperature of the double faced corrugated fiberboard sheet 7 is maintained appropriately at all times, that is, the moisture content of the double faced corrugated fiberboard sheet 7 is always kept in a proper condition, thus preventing the bonding failure or wrap of the sheet material 7 and improving the quality thereof.

Secondly, a description will be given hereinbelow of a double facer for use in a corrugated fiberboard sheet manufacturing system according to a second embodiment of the present invention.

Figure 4:
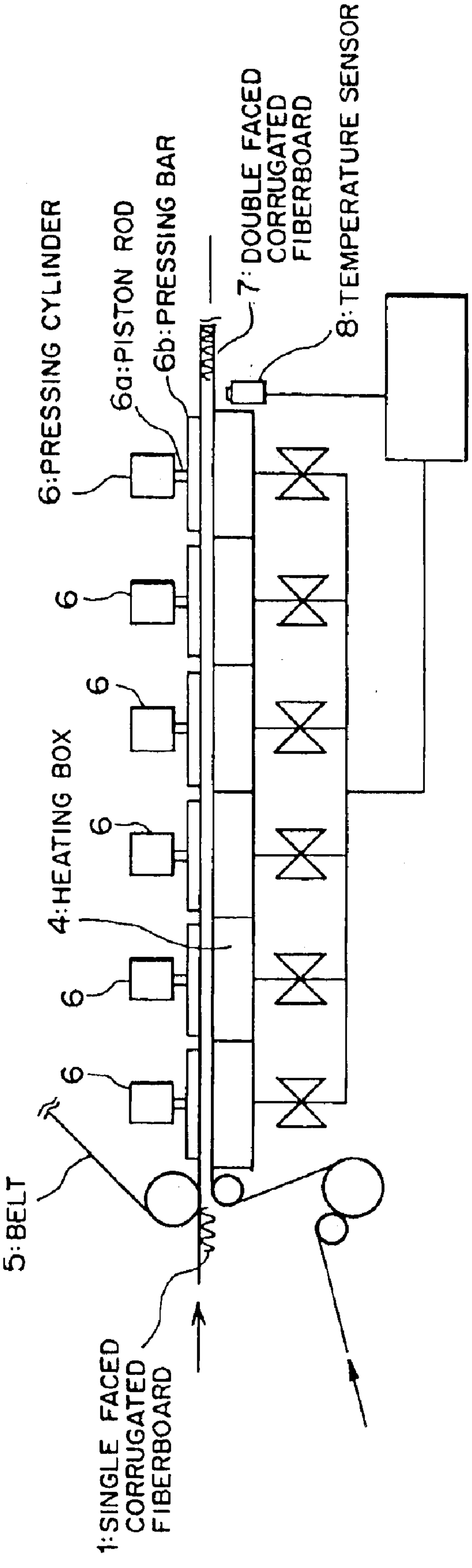
FIG. 4 illustratively shows a construction of a double facer according to a second embodiment of the invention.

FIG. 4 is an illustration of a construction designed to control a heat temperature of the heating box 4 for setting the temperature of the double faced corrugated fiberboard sheet 7 at an appropriate temperature.

Although in the above-described first embodiment the heat reception quantity control of a double faced corrugated fiberboard sheet has been based on control of a pressing quantity, in this embodiment the heat reception quantity control involves controlling a heating quantity of a heating means, that is, implementing a temperature control procedure based on the procedure shown in FIG. 2 to control a solenoid-operated steam pressure regulating valve 11 which supplies steam to the heating box 4.

That is, at the steps 106 and 107 in FIG. 2, the solenoid-operated steam pressure regulating valve 11 is feedback-controlled to reduce the aforesaid temperature deviation to zero.

Moreover, the relationship between a pressure of steam (supply amount of steam) to be supplied to the heating box 4 and a temperature of the double faced corrugated fiberboard sheet 7 can previously be found through experiments or simulations and, hence, a required alteration quantity of the steam pressure for approaching the temperature of the double faced corrugated fiberboard sheet 7 to a desired temperature can be obtained on the basis of this relationship and the temperature deviation. Thus, at the steps 108 and 109 in FIG. 2, the steam pressure regulating valve 11 is feedforward-controlled so that the aforesaid steam pressure shifts by the aforesaid required alteration quantity.

Still moreover, since an optimum temperature of the double faced corrugated fiberboard sheet 7 suitable at order change or to when the feed speed of the double faced corrugated fiberboard sheet 7 is lower than a set value can also be found previously through experiments or simulations, at the steps 110, 111 and 113, 114 in FIG. 2, the steam pressure regulating valve 11 is preset-controlled so that steam with a pressure (preset value) to realize the aforesaid optimum temperature is supplied to the heating box 4.

Although in each of the above-described embodiments the moisture content detecting means is constructed with a temperature sensor, it is also possible that a moisture sensor is employed in place of the temperature sensor. That is, in each of the above-described embodiments, a temperature of the double faced corrugated fiberboard sheet 7 is detected as a parameter correlating with a moisture content through the use of the temperature sensor 8, but it is also possible that the moisture content is detected by the moisture sensor and the same control as that mentioned above is implemented. In this case, a moisture is instead used as a physical quantity in place of a temperature in FIG. 2.

Meanwhile, in a case in which the location of the aforesaid temperature sensor 8 or moisture sensor (moisture content detecting means) is fixed, if a bias occurs in a temperature distribution or a moisture distribution of the double faced corrugated fiberboard sheet 7, then there is a possibility that difficulty is encountered in detecting a correct temperature or moisture.

Accordingly, in each of the above-described embodiments, the aforesaid temperature sensor 8 or a moisture sensor is shifted by a scanning means (not shown) to scan the double faced corrugated fiberboard sheet 7 in its width direction (direction perpendicular to the paper surface of FIG. 1) so that the time-average value of the temperatures or moistures detected during the scanning is used as an actually measured temperature value or actually measured moisture content of the double faced corrugated fiberboard sheet 7. In this case, the calculation for the time-average is made in the controller 9.

In this connection, it is also possible that a plurality of temperature sensors or moisture sensors each equivalent to the aforesaid temperature sensor 8 or moisture sensor are placed at a predetermined interval in the width direction of the double faced corrugated fiberboard sheet 7 so that the average value of the temperatures or moistures detected by these temperature sensors 8 or moisture sensors is used as an actually measured temperature or actually measured moisture of the double faced corrugated fiberboard sheet 7.

What is claimed is:

1. A double facer for use in a corrugated fiberboard sheet manufacturing system which conveys a single faced corrugated fiberboard sheet and a linerboard in a state where they are placed in a superposed condition, put between heating means and pressing means, and heated and bonded at the same time forming a double faced corrugated fiberboard sheet, said double facer comprising:

moisture content detecting means for detecting moisture content or a parameter correlating with the moisture content of said double faced corrugated fiberboard sheet after said sheet is passed through said heating means;

control means for controlling a heat reception quantity of said double faced corrugated fiberboard sheet on the basis of a detection result from said moisture content detecting means so that the moisture content of said double faced corrugated fiberboard sheet approaches a predetermined optimum moisture content, said control means including a decision means for making a decision as to whether or not a deviation between the optimum moisture content and a moisture content detected by said moisture content detecting means is below a predetermined value, said control means further including:

a feedback control element for implementing the heat reception quantity control through the use of feedback control when said decision means makes the decision that said deviation is below a predetermined value; and a feedforward control element for implementing the heat reception quantity control through the use of feedforward control when said decision means makes the decision that said deviation is equal to or more than said predetermined value.

2. A double facer for use in a corrugated fiberboard sheet manufacturing system according to claim 1, wherein said control means controls a pressing force of said pressing means to control the heat reception quantity.

3. A double facer for use in a corrugated fiberboard sheet manufacturing system according to claim 2, wherein said control means further includes a control element for implementing preset control during an order change to realize heat reception control agreeing with the order change.

4. A double facer for use in a corrugated fiberboard sheet manufacturing system according to claim 2, wherein said control means further includes a control element for, when feed speeds of said single faced corrugated fiberboard sheet and said linerboard are lower than a predetermined speed, implementing preset control to realize heat reception control agreeing with the feed speed lower than said predetermined speed.

5. A double facer for use in a corrugated fiberboard sheet manufacturing system according to claim 4, wherein said control element implementing preset control sets an alteration quantity greater than an alteration quantity set by said feedforward control element.

6. A double facer for use in a corrugated fiberboard sheet manufacturing system according to claim 2, wherein a temperature sensor is used as said moisture content detecting means.

7. A double facer for use in a corrugated fiberboard sheet manufacturing system according to claim 2, wherein a moisture sensor is used as said moisture content detecting means.

8. A double facer for use in a corrugated fiberboard sheet manufacturing system according to claim 2, further comprising scanning means for shifting said moisture content detecting means to scan said double faced corrugated fiberboard sheet in its crosswidth direction and time-averaging means for time-averaging outputs of said moisture content detecting means scanning-shifted by said scanning means.

9. A double facer for use in a corrugated fiberboard sheet manufacturing system according to claim 2, wherein a plurality of said moisture content detecting means are located at a predetermined interval in a crosswidth direction of said double faced corrugated fiberboard sheet, and width direction-averaging means is additionally provided to average outputs of said plurality of moisture content detecting means.

10. A double facer for use in a corrugated fiberboard sheet manufacturing system according to claim 2, wherein said control means sets said optimum moisture content on the basis of at least one of a feed speed, fiberboard type, basic weight and flute type.

11. A double facer for use in a corrugated fiberboard sheet manufacturing system according to claim 1, wherein said control means controls a heating quantity of said heating means to perform the heat reception quantity control.

12. A double facer for use in a corrugated fiberboard sheet manufacturing system according to claim 11, wherein said control means further includes a control element for implementing preset control during an order change to realize heat reception control agreeing with the order change.

13. A double facer for use in a corrugated fiberboard sheet manufacturing system according to claim 11, wherein said control means further includes a control element for, when feed speeds of said single faced corrugated fiberboard sheet and said linerboard are lower than a predetermined speed, implementing preset control to realize heat reception control agreeing with the feed speed lower than said predetermined speed.

14. A double facer for use in a corrugated fiberboard sheet manufacturing system according to claim 13, wherein said control element implementing preset control sets an alteration quantity greater than an alteration quantity set by said feedforward control element.

15. A double facer for use in a corrugated fiberboard sheet manufacturing system according to claim 11, wherein a temperature sensor is used as said moisture content detecting means.

16. A double facer for use in a corrugated fiberboard sheet manufacturing system according to claim 11, wherein a moisture sensor is used as said moisture content detecting means.

17. A double facer for use in a corrugated fiberboard sheet manufacturing system according to claim 11, further comprising scanning means for shifting said moisture content detecting means to scan said double faced corrugated fiberboard sheet in its cross direction and time-averaging means for time-averaging outputs of said moisture content detecting means scanning-shifted by said scanning means.

18. A double facer for use in a corrugated fiberboard sheet manufacturing system according to claim 11, wherein a plurality of said moisture content detecting means are located at a predetermined interval in a width direction of said double faced corrugated fiberboard sheet, and width direction averaging means is additionally provided to average outputs of said plurality of moisture content detecting means.

19. A double facer for use in a corrugated fiberboard sheet manufacturing system according to claim 11, wherein said control means sets said optimum moisture content on the basis of at least one of a feed speed, fiberboard type, basic weight and flute type.

20. A double facer for use in a corrugated fiberboard sheet manufacturing system according to claim 1, wherein said feedforward control element implements the heat reception quantity control through the use of said feedforward control utilizing a calculated value based upon previously obtained data.

21. A double facer for use in a corrugated fiberboard sheet manufacturing system which conveys a single faced corrugated fiberboard sheet and a linerboard in a state where they are placed in a superposed condition, put between heating means and pressing means, and heated and bonded at the same time forming a double faced corrugated fiberboard sheet, said double faced comprising:

moisture content detecting means for detecting moisture content or a parameter correlating with the moisture content of said double faced corrugated fiberboard sheet after said sheet is passed through said heating means; and control means for controlling a heat reception quantity of said double faced corrugated fiberboard sheet on the basis of a detection result from said moisture content detecting means so that the moisture content of said double faced corrugated fiberboard sheet approaches a predetermined optimum moisture content, said control means including a decision means for making a decision as to whether or not a deviation between the optimum moisture content and a moisture content detected by said moisture content detecting means is below a predetermined value, said control means controlling pressing force of said pressing means and further including:

a feedback control element for implementing the heat reception quantity control through the use of feedback control when said decision means makes the decision that said deviation is below a predetermined value; and a feedforward control element for implementing the heat reception quantity control through the use of feedforward control when said decision means makes the decision that said deviation is equal to or more than said predetermined value, wherein said control element implementing the control using feedforward control previously stores a relationship between said moisture content or said parameter correlating with the moisture content and said pressing force of said pressing means and sets an alteration quantity of the pressing force on the basis of said relationship.

22. A double facer for use in a corrugated fiberboard sheet manufacturing system according to claim 21, wherein said control element implementing the control using feedforward control previously stores plurality of said relationship, selects a specific relationship among said plurality of said relationship on the basis of at least one of a feed speed of said corrugated fiberboard sheet, fiberboard type and flute and sets the alteration quantity of the pressing force on the basis of said selected relationship.

23. A double facer for use in a corrugated fiberboard sheet manufacturing system which conveys a single faced corrugated fiberboard sheet and a linerboard in a state where they are placed in a superposed condition, put between heating means and pressing means, and heated and bonded at the same time forming a double faced corrugated fiberboard sheet, said double facer comprising:

moisture content detecting means for detecting moisture content or a parameter correlating with the moisture content of said double faced corrugated fiberboard sheet after said sheet is passed through said heating means;

control means for controlling a heat reception quantity of said double faced corrugated fiberboard sheet on the basis of a detection result from said moisture content detecting means so that the moisture content of said double faced corrugated fiberboard sheet approaches a predetermined optimum moisture content, said control means including a decision means for making a decision as to whether or not a deviation between the optimum moisture content and a moisture content detected by said moisture content detecting means is below a predetermined value, said control means controlling a heating quantity of said heating means to perform heat reception quantity control and further including:

a feedback control element for implementing the heat reception quantity control through the use of feedback control when said decision means makes the decision that said deviation is below a predetermined value and a feedforward control element for implementing the heat reception quantity control through the use of feedforward control when said decision means makes the decision that said deviation is equal to or more than said predetermined value, wherein said control element implementing the control using feedforward control previously stores a relationship between said moisture content or said parameter correlating with the moisture content and said heating quantity of said heating means and sets an alteration quantity of the heating quantity on the basis of said relationship.

24. A double facer for use in a corrugated fiberboard sheet manufacturing system according to claim 23, wherein said control element implementing the control using feedforward control previously stores plurality of said relationship, selects a specific relationship among said plurality of said relationship on the basis of at least one of a feed speed of said corrugated fiberboard sheet, fiberboard type and flute and sets the alteration quantity of the heating quantity on the basis of said selected relationship.

25. A double facer for use in a corrugated fiberboard sheet manufacturing system which conveys a single faced corrugated fiberboard sheet and a linerboard in a state where they are placed in a superposed condition, put between heating box and pressing bar, and heated and bonded at the same time forming a double faced corrugated fiberboard sheet, said double facer comprising:

a moisture content detector to detect moisture content or a parameter correlating with the moisture content of said double faced corrugated fiberboard sheet after said sheet is passed through said heating box;

a controller which is communicably connected to said moisture content detector, to control a heat reception quantity of said double faced corrugated fiberboard sheet on the basis of a detection result from said moisture content detector so that the moisture content of said double faced corrugated fiberboard sheet approaches a predetermined optimum moisture content, said controller including a decision device to make a decision as to whether or not a deviation between the optimum moisture content and a moisture content detected by said moisture content detector is below a predetermined value, said controller further including:

a feedback control element to implement the heat reception quantity control through the use of feedback control when said decision device makes the decision that said deviation is below a predetermined value; and a feedforward control element to implement the heat reception quantity control through the use of feedforward control when said decision device makes the decision that said deviation is equal to or more than said predetermined value.

26. A double facer for use in a corrugated fiberboard sheet manufacturing system according to claim 25, wherein said feedforward control element implements the heat reception quantity control through the use of said feedforward control utilizing a value based upon previously obtained data.

* * * * *